(12) United States Patent
Czupi et al.

(10) Patent No.: US 9,128,515 B2
(45) Date of Patent: Sep. 8, 2015

(54) CONTROL DEVICE FOR PROVIDING A RECONFIGURABLE OPERATOR INTERFACE

(71) Applicant: General Electric Company, Schenectady, NY (US)

(72) Inventors: Balint Czupi, Budapest (HU); Norbert Siklos, Budapest (HU); Zsofia Beky, Budapest (HU); Norbert Krizsan, Budapest (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 107 days.

(21) Appl. No.: 13/677,340

(22) Filed: Nov. 15, 2012

(65) Prior Publication Data

US 2013/0120241 A1    May 16, 2013

(30) Foreign Application Priority Data

Nov. 15, 2011  (EP) ..................................... 11462022

(51) Int. Cl.
```
G06F 3/01      (2006.01)
G05B 19/042    (2006.01)
G05B 19/10     (2006.01)
```
(52) U.S. Cl.
CPC .............. *G06F 3/01* (2013.01); *G05B 19/0423* (2013.01); *G05B 19/108* (2013.01)

(58) Field of Classification Search
CPC ..... G05B 19/108; G05B 19/0423; G06F 3/01
USPC ................................................ 345/168, 170
See application file for complete search history.

(56) References Cited

U.S. PATENT DOCUMENTS

| | | | |
|---|---|---|---|
| 4,454,596 A | 6/1984 | Wunsch et al. | |
| 4,488,148 A | 12/1984 | Kuciera | |
| 5,519,832 A * | 5/1996 | Warchol | .......................... 714/46 |
| 5,582,522 A | 12/1996 | Johnson | |
| 6,000,825 A | 12/1999 | Fredriksson | |

(Continued)

FOREIGN PATENT DOCUMENTS

WO          200171878 A      9/2001

OTHER PUBLICATIONS

European Search Report and Written Opinion dated May 22, 2012 which is issued in connection with EP Patent Application No. 11462022.2 which was filed on Nov. 15, 2011.

*Primary Examiner* — Quan-Zhen Wang
*Assistant Examiner* — Xuemei Zheng
(74) *Attorney, Agent, or Firm* — GE Global Patent Operation; Marc A. Vivenzio (57) ABSTRACT

A control device for providing a reconfigurable operator interface for a medical apparatus is provided. The control device comprises a control surface comprising at least one control actuator arranged on the control surface. The control device further comprises a plurality of modules arranged side-by-side and attached to each other via adjacent abutting side surfaces in a liquid-tight manner, wherein the plurality of modules comprise a first terminal module having a closing end surface and an abutting side surface opposite the closing end surface, and a second terminal module having an abutting side surface facing towards the abutting side surface of the first terminal module, and an opposite closing end surface. Operation of the control device is enabled when all the abutting side surfaces of the plurality of modules are in an attached state.

19 Claims, 7 Drawing Sheets

(56) References Cited

U.S. PATENT DOCUMENTS

| | | |
|---|---|---|
| 6,167,337 A | 12/2000 | Haack et al. |
| 6,282,646 B1 * | 8/2001 | Hendry et al. ................. 713/100 |
| 6,559,773 B1 | 5/2003 | Berry |
| 6,697,681 B1 * | 2/2004 | Stoddard et al. ................. 700/17 |
| 7,209,123 B2 * | 4/2007 | Andres et al. ................. 345/168 |
| 7,994,798 B2 * | 8/2011 | Williams et al. ............... 324/537 |
| 2002/0149568 A1 * | 10/2002 | Kim ................................ 345/170 |
| 2004/0066374 A1 | 4/2004 | Holloway et al. |
| 2007/0133150 A1 * | 6/2007 | Sekine et al. .................. 361/600 |
| 2007/0171196 A1 | 7/2007 | Pfingsten |
| 2008/0019085 A1 * | 1/2008 | Nakajima ..................... 361/680 |
| 2011/0184335 A1 * | 7/2011 | Bedenbaugh ................... 604/20 |

\* cited by examiner

CONTROL DEVICE FOR PROVIDING A RECONFIGURABLE OPERATOR INTERFACE

BACKGROUND OF THE INVENTION

Embodiments of the present invention relate to a control device for providing a reconfigurable operator interface for a medical apparatus.

The control of various apparatuses is becoming more and more complex, especially in the field of medical applications. New features and functionalities are appearing e.g. for X-ray or other medical purposes. There is a need for controllers, control devices enabling a simple accommodation of these new functionalities, examinations and medical interventions without a complete re-design of the control device.

Another need is connected to the fact that a medical apparatus can be used in various medical applications requiring different control options. An X-ray apparatus used e.g. for cardiography only necessitates a few control actuators, push-buttons, while the same apparatus needs many control options when used for neurology applications. It is generally known that control devices should be as compact as possible without unused control actuators, as unused control actuators may result in delays and false controls due to uncertainties of the operating person. Furthermore, control actions are often carried out in dark environments, as complicated medical operations are mainly followed on screens. Therefore, operators are not in favor of a 'universal' control device accommodating all possible control options and always having some unused control actuators in different locations thereon, depending on the actual application.

It is also known that control devices realized on touch-screens are readily reconfigurable. However, also for the above mentioned reasons, medical applications need hardware control actuators, such as pushbuttons and joysticks. The operating person needs a tactile feedback when a control actuator is actuated.

A further need is to enable the re-assignment of control functions to the control actuators in a dynamic way. For example, left-handed users may prefer to mirror the functionalities of the control device. Control devices can be usually positioned at more than one place around the medical apparatus to be controlled. If the control device is e.g. repositioned on the opposite side of the apparatus, it might be desirable to mirror or change the functionalities of the control device.

Control devices with a reconfigurable hardware were not proposed in the prior art, mainly because no intelligent modules having liquid-tight attachments (being a requirement e.g. in medical applications) were available. Liquid-tight attachments have to be maintained during the entire period of operation in many applications, especially in medical ones.

U.S. Pat. No. 6,167,337 discloses a vehicle control unit that can be reconfigured according to application needs via an operator input or a specific message on a specific bus interface.

U.S. Pat. No. 6,559,773 B1 discloses a dynamically reconfigurable control display that can reconfigure itself when a new device is added to the system. A computer program enabling the work with the new device is obtained either from a local archive or from a remote one via wireless means.

US 2004/0066374 A1 discloses a configurable keyboard where the display of the keys can be changed according to the keyboard's mapping.

The known solutions do not provide the possibility to change, reconfigure the hardware control actuators of control devices.

Thus, there is a need for a control device eliminating the drawbacks of prior art control devices. There is a particular need for a control device allowing reconfiguration of the hardware control actuators thereon, while maintaining liquid-proof properties usually needed for such applications. There is also a need for a control device that is only enabled if its modules are attached in a liquid-tight or liquid-proof manner.

BRIEF DESCRIPTION OF THE INVENTION

According to an embodiment of the present invention, a control device for providing a reconfigurable operator interface for a medical apparatus is provided. The control device comprises a control surface comprising at least one control actuator arranged on the control surface. The control device further comprises a plurality of modules arranged side-by-side and attached to each other via adjacent abutting side surfaces in a liquid-tight manner, wherein the plurality of modules comprise a first terminal module having a closing end surface and an abutting side surface opposite the closing end surface, and a second terminal module having an abutting side surface facing towards the abutting side surface of the first terminal module, and an opposite closing end surface. Operation of the control device is enabled when all the abutting side surfaces of the plurality of modules are in an attached state.

BRIEF DESCRIPTION OF THE DRAWINGS

Characteristics, objectives and advantages of embodiments of the subject matter will become apparent from the following description, which is given solely by way of illustration and is non-limiting, and is to be read with reference to the appended drawings in which.

DETAILED DESCRIPTION OF THE INVENTION

Figure 1:
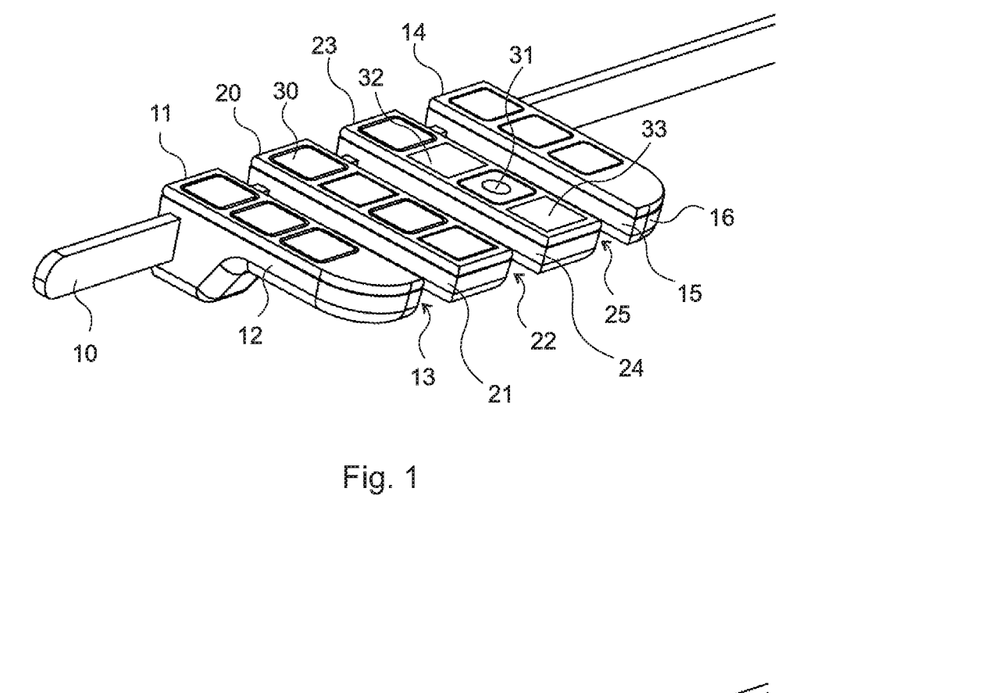
FIG. 1 illustrates a schematic view of a control device in accordance with the subject matter described herein, where modules of the control device are in an un-attached state.

Referring first to FIG. 1, a control device with reconfigurable controller hardware is shown that can be easily customized to support the needs of different users or different applications.

The control device provides a reconfigurable operator interface for a medical apparatus. The control device comprises a control surface and control actuators arranged on the control surface. The control surface is provided by modules, which are arranged side-by-side on a support rail 10 and can be attached to each-other via their adjacent abutting side surfaces in a liquid-tight manner. The modular control device can be extended with modules to accommodate new control actuators (buttons, joysticks or touch-screens) if needed, while ensuring a safe operation maintaining liquid-proof properties. In FIG. 1, the modules are in an un-attached state in which the control device cannot be activated.

The modules comprise a first terminal module 11 having a closing end surface 12 and an abutting side surface 13 opposite the closing side surface 12, as well as a second terminal module 14 having an abutting side surface 15 facing towards the abutting side surface 13 of the first terminal module 11, and an opposite closing end surface 16. The terminal modules 11, 14 may also serve ergonomic purposes by providing rounded edges at the sides of the device.

The particular control device also contains two intermediate modules 20, 23, which are arranged between the first terminal module 11 and the second terminal module 14. The intermediate modules 20, 23 can be attached to each-other and to the first and second terminal modules 11, 14 via their adjacent abutting side surfaces 21, 22, 24, 25 in a liquid-tight manner. Intermediate modules 20, 23 only contain a few control actuators and enable limited functionality additions to the system.

The control device also comprises means for enabling an operation of the control device only if all the abutting side surfaces 13, 15, 21, 22, 24, 25 in the control device are in an attached state. In this way, safe operation is ensured during the entire operation period of the control device. The enabling means may comprise a switch. The switch may be a mechanical, electrical, magnetic, optical or software switch, and can be realized in any suitable way.

The enable signal of the switch may activate the communication and control functionalities of the control device. As discussed later, the active modules of the control device may be interconnected with bus connectors arranged on the abutting side surfaces, so it may be advantageous to enable operation only if the bus is in an un-interrupted state.

All the modules of the exemplary embodiment are active, i.e. they are control modules carrying segments of the total control surface. Each control module has at least one configurable control actuator arranged thereon. Separate display means may be assigned to each or to the majority of the control actuators. The display means display information relating to the actual function assigned to the particular control actuator. The displayed information can also indicate the state of the controlled function, like enabled, disabled, active, selected, highlighted, warning sign. By the application of such display means, the re-configuration is more flexible and apparent, while a high level of effectiveness, safety, learnability and intuitiveness are maintained The modules may comprise pushbuttons as control actuators like pushbutton 30 in intermediate module 20. Pushbutton 30 may have a transparent surface, and the display means in this case can be an LCD display unit arranged below the transparent surface. So, the pushbuttons on the modules can be backlit with LCD display units, allowing an easy change of the indicated 'labels'.

The modules may also comprise joysticks as control actuators, like joystick 31 in intermediate module 21. In this case, the display means may be LCD display units 32, 33 oppositely arranged around the joystick 31. So, the labeling of joystick 31 can be easily configured for different purposes.

Figure 2:
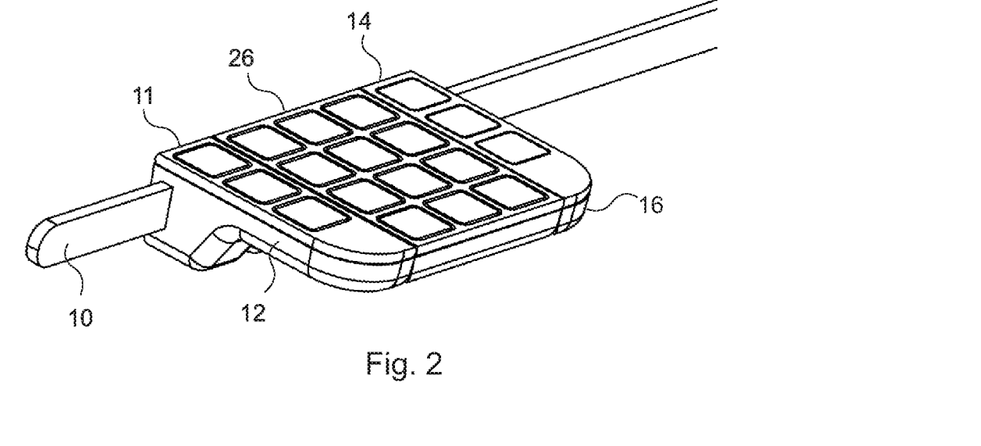
FIG. 2 shows a schematic view of the control device in FIG. 1 with the modules in an attached state.

FIG. 2 shows a schematic view of another embodiment of the control device, where the modules are in an attached state. The embodiment contains only one intermediate module 26 having pushbuttons. The attached state means that the modules are connected to each other in a liquid-tight manner, so no liquid can penetrate between the modules, and the electrical contacts of the bus connectors are safely protected.

Figure 3:
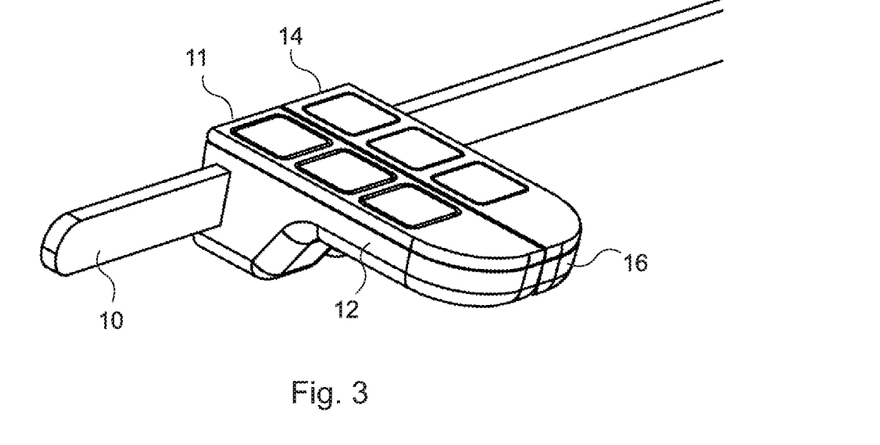
FIG. 3 illustrates a schematic view of another control device in accordance with the subject matter described herein.
Figure 4:
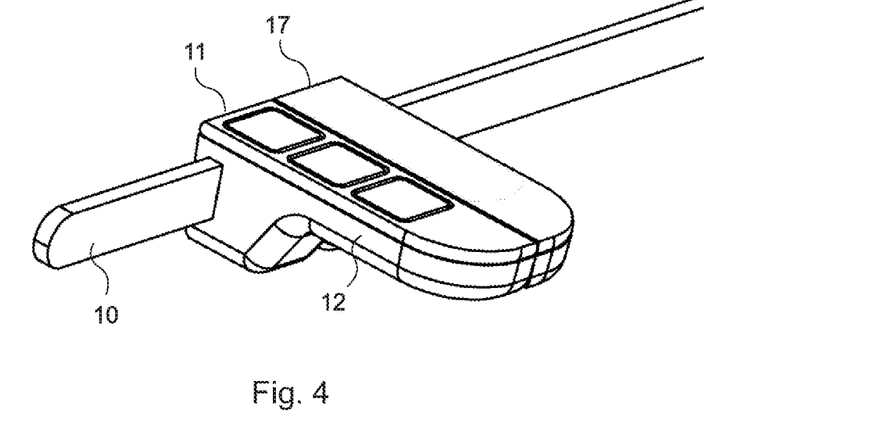
FIG. 4 shows a schematic view of a further control device in accordance with the subject matter described herein.

In an embodiment shown in FIG. 3 the control device does not contain any intermediate module. Only the two terminal modules 11, 14 are present and both of them are active, i.e. control module. It some embodiments, however, one or both of the terminal modules are passive and do not provide any control possibilities. In the embodiment shown in FIG. 4, second terminal module 17 is passive. Also in this case, an enabling means is realized in the control device, e.g. by means of a software switch detecting the bus connector of the passive terminal module 17 having a special wiring or interconnection.

Figure 5:
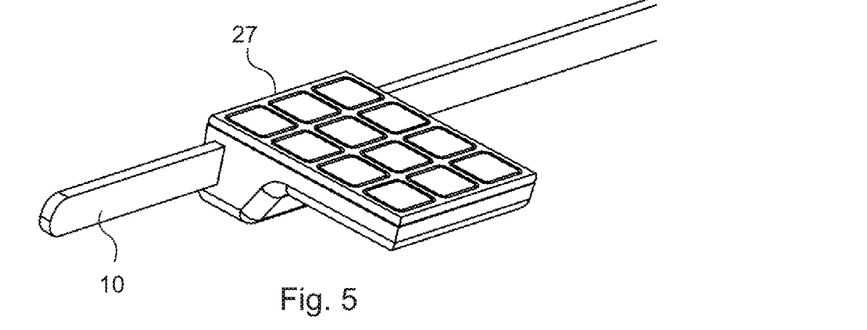
FIG. 5 illustrates a schematic view of an intermediate module.
Figure 6:
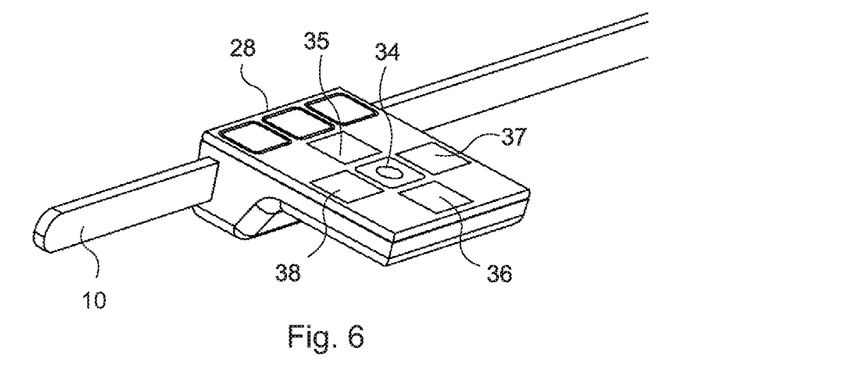
FIG. 6 shows a schematic view of another intermediate module.

FIG. 5 illustrates an intermediate module 27 having pushbuttons on its control surface segment. The modules of the control device may be slidably mounted onto the support rail 10. FIG. 6 shows an intermediate module 28 having a four-directional joystick 35 in addition to some pushbuttons. The joystick is surrounded by four oppositely arranged LCD display units 35, 36, 37, 38 showing what each joystick axis is controlling. The LCDs may show different joystick functions as the user reconfigures the joystick to his needs.

Figure 7:
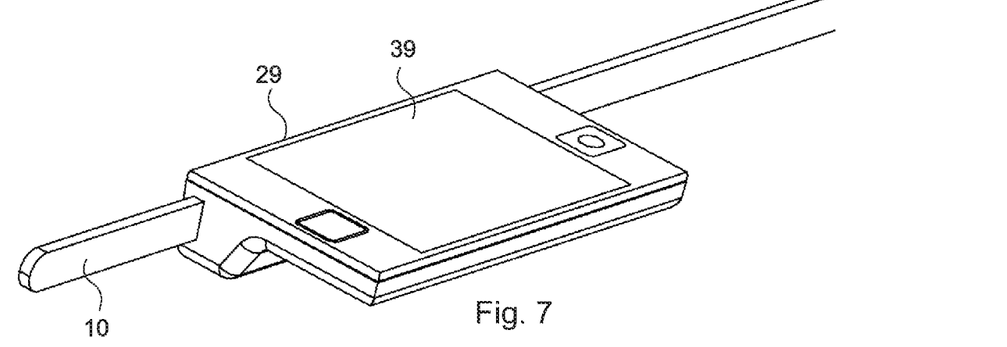
FIG. 7 illustrates a schematic view of a further intermediate module.

Intermediate module 29 shown in FIG. 7 accommodates a touch-screen 39. The touch-screen 39 may contain any type of controls or can display images and messages.

Figure 8:
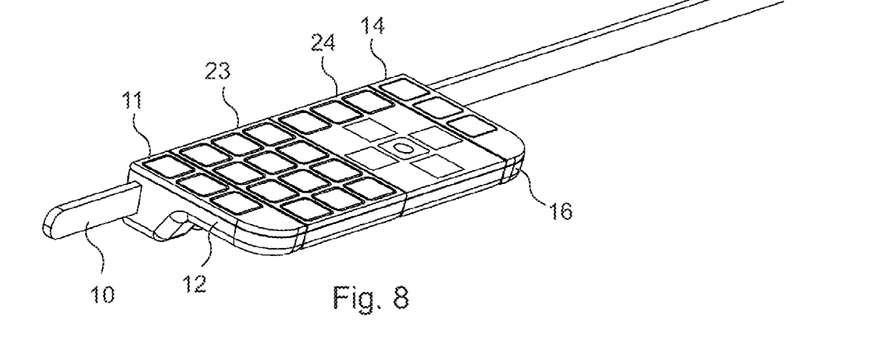
FIG. 8 illustrates a schematic view of a more complex control device in accordance with the subject matter described herein.
Figure 9:
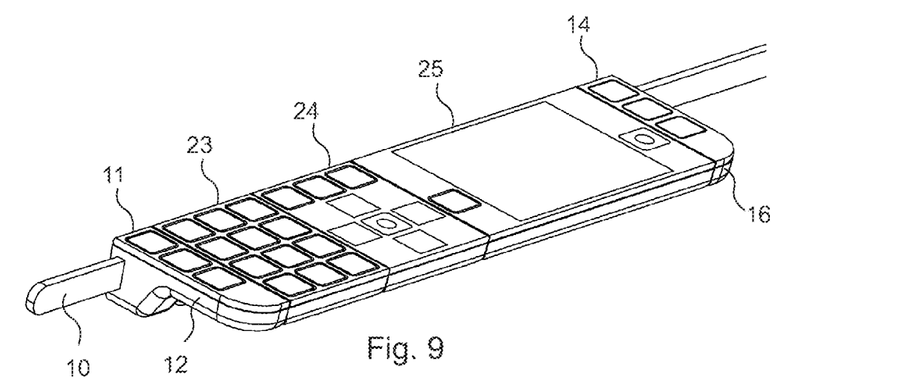
FIG. 9 shows a schematic view of an even more complex control device in accordance with the subject matter described herein.
Figure 10:
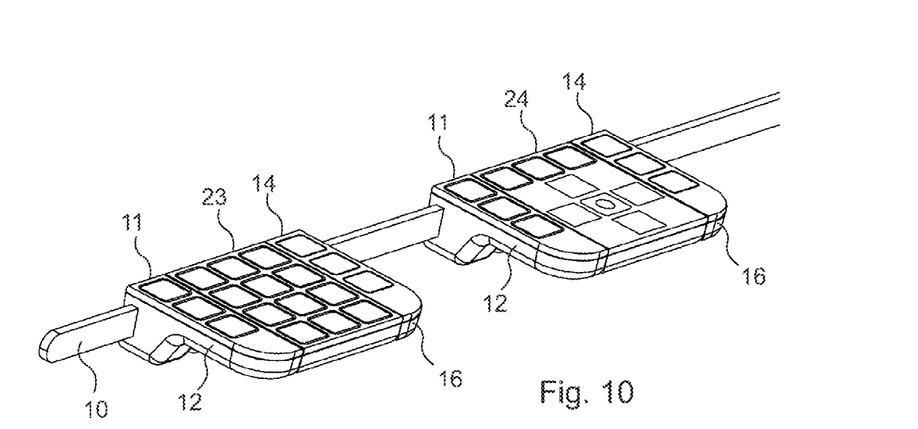
FIG. 10 illustrates a schematic view of two control devices fixed to a common support rail.

FIGS. 8 to 10 illustrate various control device configurations realized with the above described modules. It can be seen that the control device can be configured and extended according to the given needs or applications.

Figure 11:
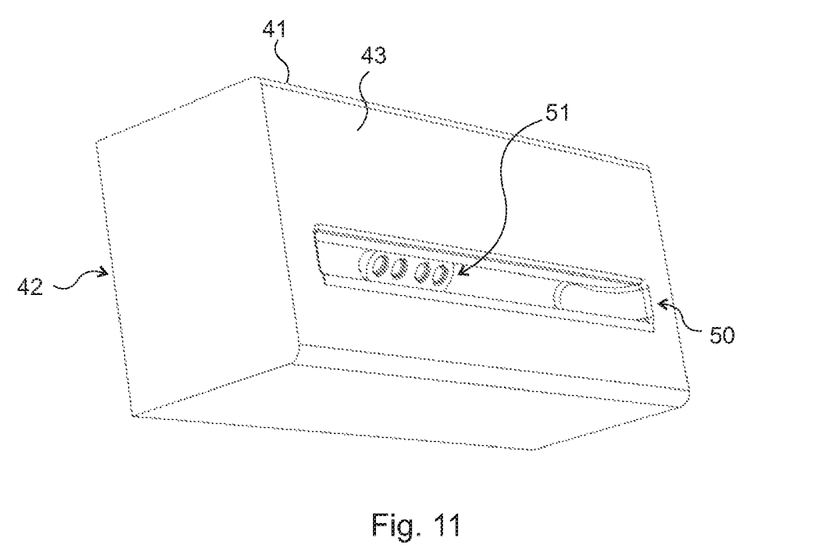
FIG. 11 shows a schematic view of a module having a recess and a bus connector therein.
Figure 12:
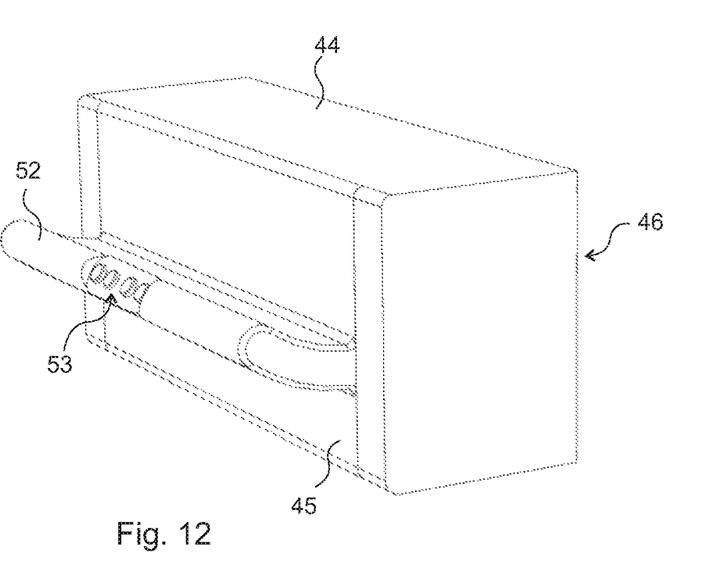
FIG. 12 illustrates a schematic view of a module having a protrusion and a bus connector thereon.

FIGS. 11 and 12 schematically show a first terminal module 41 having a closing end surface 42 and an abutting side surface 43 opposite the closing side surface 42, as well as a second terminal module 44 having an abutting side surface 45 and an opposite closing end surface 46. A recess 50 accommodating a female bus connector 51 is formed in the abutting side surface 43 of the first terminal module 41. A protrusion 52 formed on the abutting side surface 45 of the second terminal module 44 carries a male bus connector 53.

Figure 13:
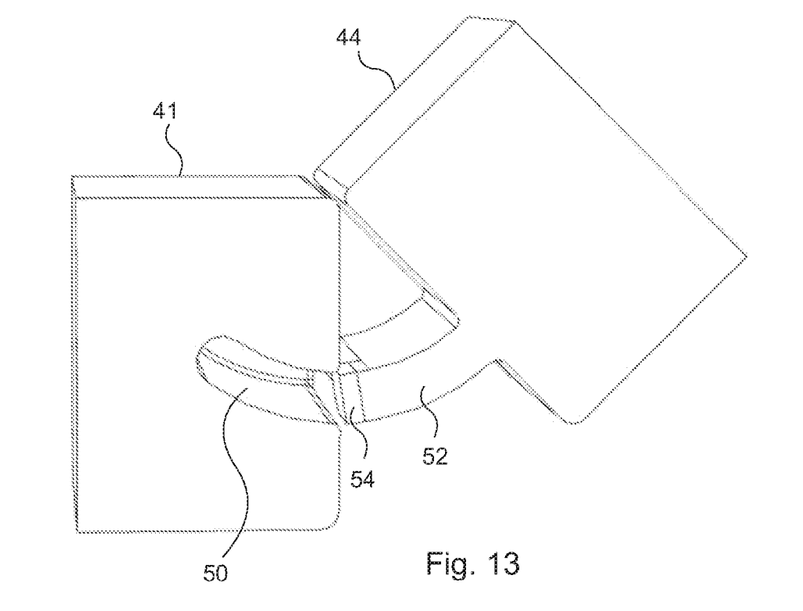
FIG. 13 illustrates a schematic view of the mating of the modules of FIGS. 11 and 12.

FIG. 13 depicts an intermediate state of the mating of the two modules in cross section. An additional sealing insert 54 can be placed onto the end of the protrusion around the male bus connector 53 for enhancing the sealing of the connectors. After joining the two modules, the modules can be attached to the support rail 10, whereby the modules are fixed to each-other safely due to the structural constraints. A sealing edge may also be provided around the abutting side surfaces in order to enhance the sealing properties.

Figure 14:
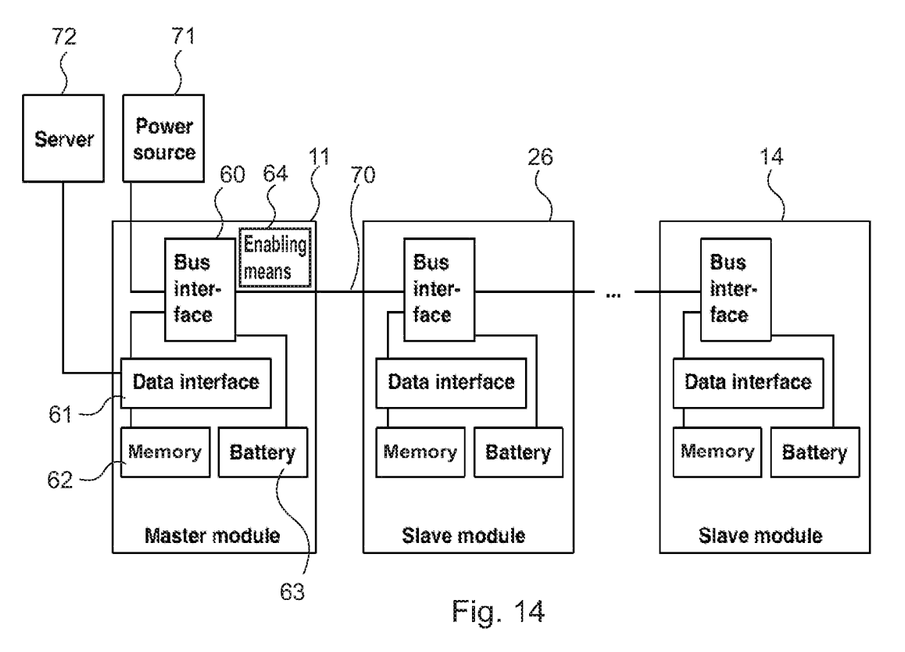
FIG. 14 depicts a schematic diagram of the structure of a control device in accordance with the subject matter described herein.

A schematic diagram of the structure of the control device in FIG. 2 is depicted in FIG. 14. Each module 11, 14, 26 of the control device comprises a configuring bus interface 60 and a memory 62 assigned to the control actuators. A function is assignable to the control actuators by storing data relating to the functions via the configuring bus interface 60 into the memory 62. A data interface 61 serves for organizing the transfer of data. Memory 62 may store the relations between the control actuators and the displayed images on their respective displays, e.g. a message that is displayed when the user actuates the control actuator.

If the control device has more than one control module, the configuring bus interfaces 60 of the control modules may be linked to each other via respective configuring bus connectors arranged at the abutting side surface(s) of the control modules, e.g. like in the embodiment depicted in FIGS. 11 to 13. In this case, the same configuring bus 70, which can be an Ethernet bus, may be linked to the configuring bus interfaces 60. The configuring bus interfaces 60 may also serve as control bus interfaces, and the configuring bus 70 may also serve as a control bus carrying control signals of the control device. The control bus can be a CAN (Controller Area Network) bus.

FIG. 14 also shows that one of the control modules can be a master control module, while the remaining control modules may be slave control modules, in which case the communication to and from the slave control modules may be organized by the master control module. In the depicted embodiment, the enabling means 64 is a software module stored in the master module. The enabling means 64 may check whether the bus connectors of the intermediate modules 26 are in an attached state and whether the second terminal module 14 is also attached, and enables the operation of the entire control device only if both conditions are satisfied.

The proposed modular controller system may consist of a set of modules that may be attached side-by-side to the support rail of e.g. a table of an X-ray apparatus. The modular design allows the addition or removal of modules, so smaller or larger user interfaces can be created to meet the actual needs.

By means of these aspects of the device, development engineers or even the users themselves can easily customize the user interface for different applications and needs. Moreover, it is also possible to allow different users of the same system to customize their own preferred configuration, or the same user can customize the user interface for different applications.

The control modules can be fixed side-by-side on the rail. If only basic functions are used, only a few controller modules are attached. If a user wishes to control more functions from the table-side, he just attaches more modules. The developers may also recommend or supply more controller modules if a new functionality is introduced.

In case more users are necessary for controlling the apparatus, more than one control device may be attached at different locations.

Users can decide what controls to be included on the table-side controllers and at which location. Each user can create an own profile that contains the functions and the location of each function. The proposed control device results an easier introduction of new features and functionalities at reduced engineering efforts.

The control device may comprise a program means effecting a rearrangement of the functions of the control actuators. This program means may also be controlled by one or some of the control actuators. This enables a dynamic re-configuration, e.g. for left-handed users or when the control device is re-located around the apparatus to be controlled.

Visual feedback to the user may be provided by the LCD display units as described above. The LCD display units may be located under the control surface, under or next to the given control actuator. The displayed text or image may be changed via a server 72 even in real-time, which enables the indication of e.g. a disabled state of a control actuator, or the assigning of a new function to a pushbutton even during the system is powered and running.

As depicted in FIG. 14, the configuration messages may be processed by the master module. The communication between the master module and the server 72 may be realized via Ethernet, or via other wired or wireless connections. The master module communicates with the slave modules via the bus interfaces 60 and bus 70.

The master module may receive power from an outside power source 71 through wired connection or by induction charging. The master module may distribute the power to the slave modules via the bus 70. Each module may have an internal battery 63 which supplies enough power for a limited duration in case if power failure occurs.

Alternatively, there may be no master-slave relationships between the modules and each module may communicate with the server 72 and may be powered independently.

Figure 15:
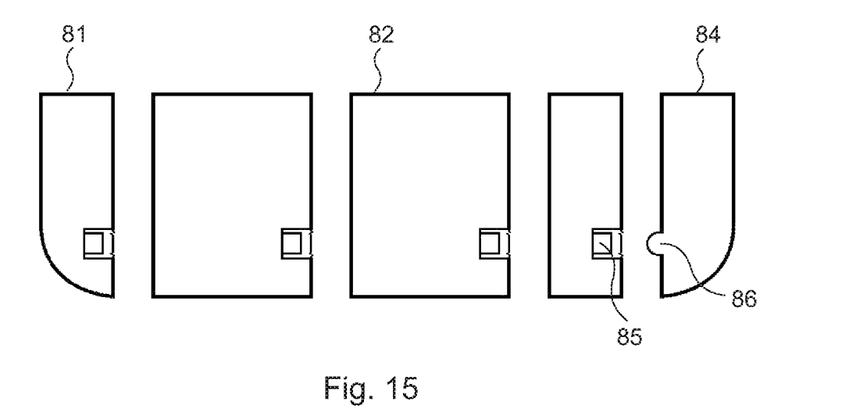
FIG. 15 schematically shows the modules of a control device and a means for enabling operation only if the modules are in an attached state.
Figure 16:
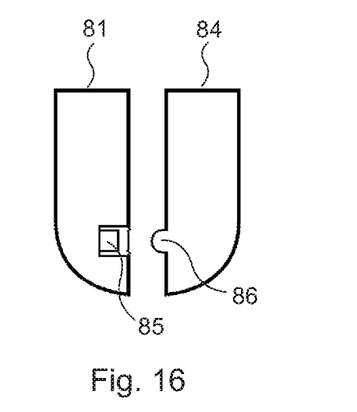
FIG. 16 shows a schematic view similar to FIG. 15 of a simple control device consisting of only the two terminal modules.

FIG. 15 schematically shows the modules of a control device and hardware elements forming a part of the means 64 for enabling operation only if the modules are in an attached state. The control device consists of a first terminal module 81, intermediate modules 82 and a second terminal module 84. Every active module (master and slave modules) has a watertight switch 85 on its right side. The switch 85 serves as an activator enabling the use of the control device. The closing module (which can be active or passive), being the second terminal module 84, has a protrusion 86 on its left side, which activates the aforementioned switch 85. FIG. 16 shows a minimum configuration of the control device consisting of the first and second terminal modules 81, 84, only. This way, the protrusion 86 and the corresponding switch 85—both together forming a part of the enabling means 64—activate the system at attaching the closing module. The attached state of the further modules can be checked e.g. by the presence of an uninterrupted bus connection between the modules. So, this way the control device cannot be activated by the enabling means 64 without an attached closing module.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control device for providing a reconfigurable operator interface for a medical apparatus, the control device comprising:
    a control surface comprising at least one control actuator arranged on the control surface; and
    a plurality of modules arranged side-by-side and attached to each other via adjacent abutting side surfaces in a liquid-tight manner, wherein the plurality of modules comprise:

a first terminal module having a closing end surface and an abutting side surface opposite the closing end surface; and a second terminal module having an abutting side surface facing towards the abutting side surface of the first terminal module, and an opposite closing end surface, wherein operation of the control device is enabled when all the abutting side surfaces of the plurality of modules are in an attached state.

2. The control device according to claim 1, wherein the plurality of modules comprise a control module comprising:
at least a segment of the control surface;
at least one configurable control actuator arranged on the control module;
a configuring, bus interface; and
memory assigned to the at least one configurable control actuator,
wherein a function is assignable to the at least one configurable control actuator by storing data relating to the function via the configuring, bus interface into the memory.

3. The control device according to claim 2, wherein the first terminal module or the second terminal module is the control module.

4. The control device according to claim 2, wherein the plurality of modules comprise an intermediate module, wherein the intermediate module is the control module, and wherein the intermediate module is arranged between the first terminal module and the second terminal module.

5. The control device according to claim 2, comprising, at least two control modules, wherein the configuring bus interfaces of the control modules are linked to each other via configuring bus connectors arranged at the abutting side surfaces of the control modules, and wherein a configuring bus is linked to each of the configuring bus interfaces of the control modules.

6. The control device according to claim 5, wherein the configuring bus interfaces also serve as control bus interfaces, and wherein the configuring bus also serves as a control bus connector configured to carry control signals of the control device.

7. The control device according to claim 5, wherein one of the at least two control modules is a master control module, the other of the at least two control modules are slave control modules, and wherein communication to and from the slave control modules is organized by the master control module.

8. The control device according to claim 5, further comprising a switch configured to enable operation of the control device, wherein the switch comprises a software module configured to check whether the bus connectors of the plurality of modules are in an attached state, to check whether the second terminal module is in an attached state, and to enable the operation of the control device only if both the plurality of modules and the second terminal module are in an attached state.

9. The control device according to claim 2, further comprising a program configured to rearrange the functions of the at least one configurable control actuator.

10. The control device according to claim 9, wherein the program is controllable by at least one of the at least one configurable control actuator.

11. The control device according to claim 2, wherein the plurality of modules are arranged side-by-side and attached to each other via adjacent abutting side surfaces in a liquid-tight manner so that no liquid can penetrate between the modules.

12. The control device according to claim 1, wherein the at least one control actuator comprises a display configured to display information relating to the function of the control actuator.

13. The control device according to claim 12, wherein the at least one control actuator comprises a pushbutton with a transparent surface, and wherein the display comprises an LCD display unit arranged below the transparent surface.

14. The control device according to claim 12, wherein the at least one control actuator comprises a joystick, and wherein the display comprises at least two LCD display units arranged around the joystick.

15. The control device according to claim 12, wherein the at least one control actuator comprises a touch-screen.

16. The control device according to claim 1, further comprising a switch configured to enable operation of the control device.

17. The control device according to claim 16, wherein the switch is a mechanical switch, an electrical switch, a magnetic switch, an optical switch, a software switch or any combination thereof.

18. The control device according to claim 1, wherein operation of the control device is enabled when all the abutting side surfaces of the plurality of modules are in an attached state and are attached in a liquid tight manner.

19. The control device according to claim 1, further comprising a sealing edge around the abutting side surfaces.

* * * * *

UNITED STATES PATENT AND TRADEMARK OFFICE
CERTIFICATE OF CORRECTION

PATENT NO.        : 9,128,515 B2                                    Page 1 of 1
APPLICATION NO.   : 13/677340
DATED             : September 8, 2015
INVENTOR(S)       : Czupi et al.

It is certified that error appears in the above-identified patent and that said Letters Patent is hereby corrected as shown below:

In the Specification

In Column 4, Line 38, delete "joystick 35" and insert -- joystick 31 --, therefor.

In the Claims

In Column 7, Line 16, in Claim 2, delete "configuring," and insert -- configuring --, therefor.

In Column 7, Line 21, in Claim 2, delete "configuring," and insert -- configuring --, therefor.

In Column 7, Line 31, in Claim 5, delete "comprising," and insert -- comprising --, therefor.

Signed and Sealed this
Ninth Day of August, 2016

Michelle K. Lee
*Director of the United States Patent and Trademark Office*